March 29, 1966     J. M. GRAHAM     3,243,236
LOW-FRICTION BEARING PADS
Filed July 25, 1963
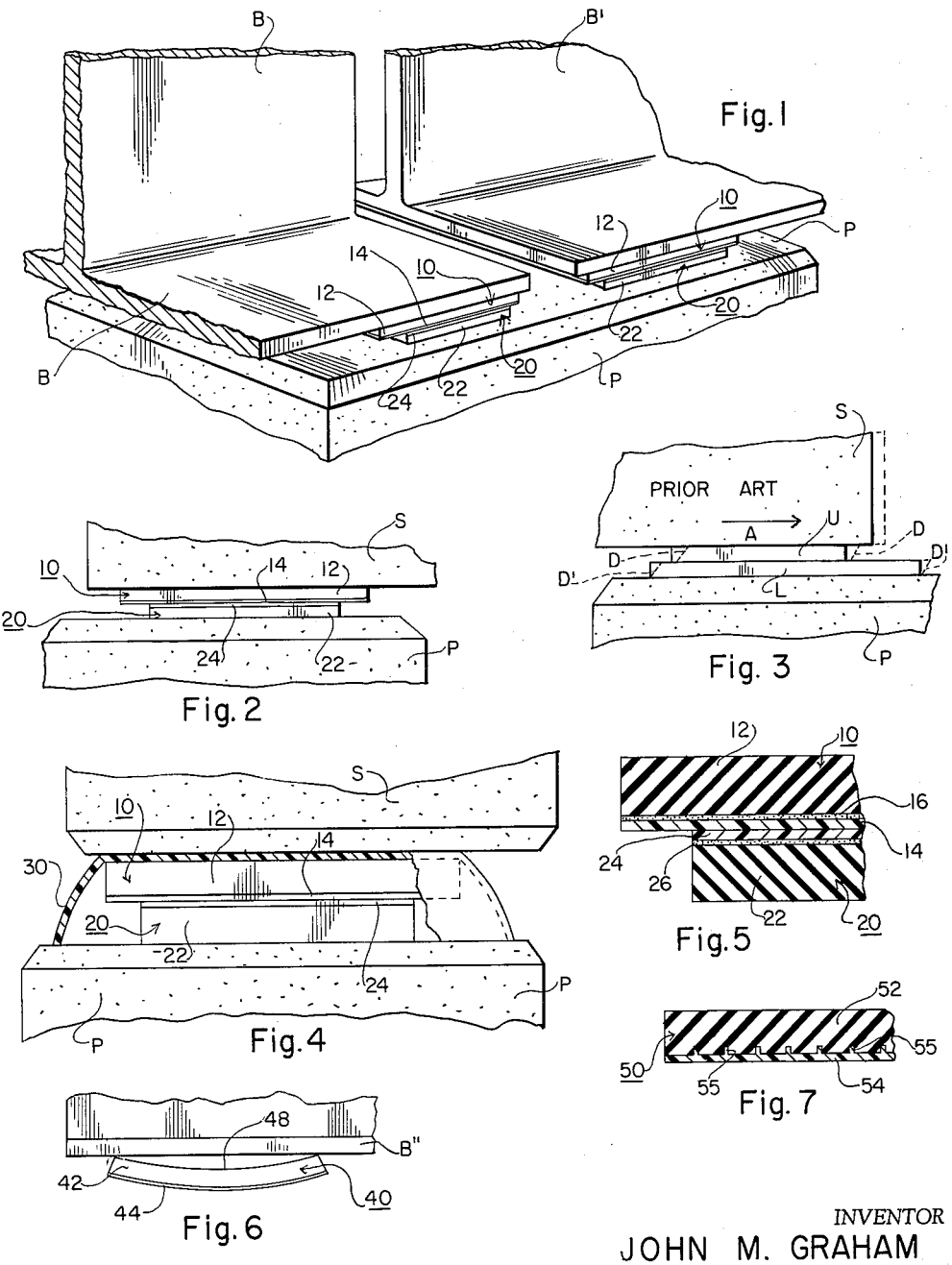
INVENTOR
JOHN M. GRAHAM

United States Patent Office 3,243,236
Patented Mar. 29, 1966

3,243,236
LOW-FRICTION BEARING PADS
John M. Graham, 1331 E. Garfield St.,
Phoenix, Ariz. 85006
Filed July 25, 1963, Ser. No. 297,591
6 Claims. (Cl. 308—3)

This invention relates to elastomeric sliding bearing pads of a type having particular utility when placed between beams or other superstructures and foundation piers or other stationary supporting bases, so as to permit the beams or other superstructures to move with respect to their supporting bases through appreciable increments due to various causes such as thermal expansion and contraction, and/or due to vertical deflections under the applied weight of dead and live loads thereon. These elastic pads are intended particularly to be used to support superstructures made of steel (such as beams, girders and trusses), prestressed concrete, or poured-in-place concrete slabs.

It is an object of this invention to provide novel and improved bearing pads for replacing prior art supporting or cushioning means such as: (1) Metal-to-metal sliding plates which are subject to severe wear as well as rust and corrosion. (2) Prior art elastomeric pads which depend on reversing internal deformations to provide movement due to expansion or contraction of the structure. These reversing deformations cause horizontal shear, and ultimately result in pad failure. Moreover, these prior-art shear-deformations require that the vertical load be limited to a minimum of 300 pounds per square inch to prevent undesirable creepage between the bearing pads and the superstructures and supporting piers. (3) Metal rockers or segmental rollers which are subject to rust and corrosion and which tend to become displaced, for instance by creeping, with the result that they may lean in the wrong direction and in some instances require jacking up of a beam supported structure so that they may be reset.

Still another object of my invention is to provide a combination of two supporting pads in which each of the pads includes a resilient rubber-like body having a special sliding surface material permanently fastened to one face and in contact with a different special sliding surface material permanently fastened to an adjacent face of the other pad, these two special sliding surface materials minimizing the sliding friction between the abutting surfaces while at the same time providing a long surface life when in use. Neoprene, butyl and chlorobutyl are some suitable elastomeric materials of which the rubber-like body of the pads can be made, since these compounds can be formed with satisfactory durometer hardness and deformation qualities, and at the same time have satisfactory aging, weathering and strength characteristics.

It is a principal object of the invention to provide improved low-friction sliding surface materials permanently fastened, for instance by cementing, to the mutually opposed surfaces of the pads. When in contact under pressure, it is an established fact that two materials having identical or sympathetic molecular structures tend to attract and interlock with each other, and that materials of dissimilar or unsympathetic molemular structures repel each other and do not mutually interlock, the former having relatively higher mutual sliding friction than the latter. Thus, it is desirable that the surface material on the bottom face of the upper pad have dissimilar or unsympathetic molecular structure as compared with the molecular structure of the surface material secured to the top of the lower pad. My tests using Teflon (polytetrafluorethylene) on the abutting surfaces of both the top and bottom pads showed mutual sliding friction which was unnecessarily high in spite of the fact that Teflon is about the slickest of the low-friction resins and plastics. Therefore, in order to reduce the sliding friction, I tried a number of materials different from Teflon on one of the pad surfaces, and finally discovered a low-friction epoxy resin. The best known combination appears to be two different resins, one being a fluorine containing resin, and this combination, when tested under realistic loading pressures, resulted in very low sliding friction values.

There are various methods of permanently laminating the surface materials to the rubber-like upper and lower pads. Tests showed that epoxy resin adhesives are very satisfactory.

The improved sliding bearing pads according to this invention provide a plurality of distinct advantages which will be readily recognized by engineers skilled in the art of structural design. My sliding pads are cheaper to manufacture than known metal bearing structures. These pads permit a smaller force to move the span end when expanding or contracting due to the rise and fall of temperatures than any type of bearing structure now in use, especially in the case of prior-art metallic bearing structures which have had time to rust or corrode. These pads provide a bearing structure which is resilient and which, therefore, cushions the structures of which they form a part. The elasticity or resilience of these pads will permit a certain degree of rotative deflection of a supported beam or other structural member caused by live and/or dead loads placed thereon. These pads can be designed to have a desired vertical deformation of the elastomers themselves to thereby provide a uniform bearing load distribution between pads and the other structures, thus preventing any concentrated point-loading of the type which occurs with steel bearing plates when rotative deflection of the structure is caused by eccentric loading. These pads have a low coefficient of friction between their unlike sliding surfaces so that a light vertical-pressure loading of only about 50 pounds per square inch is sufficient to prevent undesirable creepage between a pad face and the surface of a beam thereabove, or between a pad face and the upper surface of the supporting pier. These pads will safely carry a vertical loading of 1000 pounds per square inch, and even at such loadings, the slick, mutually-opposed sliding surfaces present only a minimum amount of friction therebetween when the structure expands or contracts due to temperature changes.

Yet another object of the invention is to provide the combination of an upper and a lower pad in sliding engagement, wherein the upper pad is longer in a direction parallel to the direction of expansion and contraction than the lower pad so it always fully covers the latter, regardless of the relative positions of the pads as a result of expansion and contraction of the structures supported thereby. This feature not only provides constant area of mutual contact for all contemplated relative pad positions, but also provides a structure wherein dirt cannot build up on any horizontal surface to increase the sliding friction between the pads, or cause abrasion.

A further object of the invention is to provide an elastomeric film of low durometer hardness draped over both pads to exclude foreign matter from their sliding surfaces.

Still another object of the invention is to provide at least the upper pad with a downwardly convex bow to insure that the pad will remain in contact with the superstructure thereabove at all times, even when the pad is eccentrically supported by the lower pad.

Other objects and advantages of the invention will become apparent during the following discussion of the drawing, wherein:

FIG. 1 is a perspective view of a stationary pier supporting two superstructure beams, with two pairs of sliding pads according to the invention interposed between the pier and the beams;

FIG. 2 is an elevation view showing two concrete structural members with a pair of elastomeric pads according to the present invention interposed therebetween;

FIG. 3 is an elevation view similar to FIG. 2 but showing a prior art structure in which the upper pad U is smaller in area than the lower pad and further showing, by dotted lines, distortion of both pads in horizontal shear directions resulting from expansion of the upper concrete slab S in the direction of arrow A with respect to the supporting pier P, the distortion being proportional to the coefficient of sliding friction between the pads;

FIG. 4 is an elevation view of a pair of pads according to the present invention over which an elastomeric sheet of low durometer hardness has been draped (shown partly broken away) to exclude dirt from the sliding structure;

FIG. 5 is a cross-sectional view through upper and lower pads comprising a preferred embodiment of the present invention;

FIG. 6 is an elevation view showing an upper pad preshaped according to a modification of the present invention; and FIG. 7 is a cross-sectional view through a further embodiment of the invention showing the plastic sliding surface attached to the elastomeric body at interlocking projections providing a stronger union therebetween.

Referring now to the drawing, FIG. 1 shows several beams, B and B' of a superstructure supported on a stationary supporting pier P and showing two pairs of pads interposed therebetween. These pads, as well as the pads shown in FIGS. 2, 4, and 5 comprise a larger-area upper pad and a smaller-area pad completely covered thereby. Each upper pad 10 includes an elastomeric body 12, an antifriction sliding surface member 14, and, as can be seen in FIG. 5, means 16 for laminating the sliding member 14 to the body 12 and comprising in the embodiment of FIG. 5 an epoxy adhesive or other effective adhesive.

Likewise, each lower pad 20 in FIGS. 1, 2, 4 and 5 comprises an elastomeric body 22 and an antifriction sliding surface member 24 secured to the body 22 by any suitable means, such as cement 26.

In the preferred embodiment of the present invention serving as a working example, the elastomeric bodies 12 and 22 are made of about one-inch thick neoprene, six inches wide and respectively six inches and ten inches long, neoprene having excellent durability under exposure to weathering. A durometer hardness substantially within the range of 50 to 90 is found to give the body enough stamina to support loads as high as 1000 p.s.i., but at the same time to give the bodies enough elasticity to allow them to conform to somewhat irregular surface shapes of the piers P or the beams B or slabs S, so as to avoid possible slipping of the bodies during expansion or contraction, even with light loading of only about 50 p.s.i., and so as to allow the bodies to distribute the unit loading over their whole areas of contact. Another advantage attributable to the resilience of the bodies lies in their ability to cushion the suspended superstructure and absorb deformations thereof due to loadings in different positions.

FIG. 2 and FIG. 3 show pairs of pads interposed between two masonry members, the latter figure showing a prior-art structure using rubber-like pads U and L without special low friction mutual sliding surfaces, so that a greater portion of the thermal expansion displacement goes into distortion of the pads as shown by the dotted lines D and D', since the coefficient of friction between the rubber pads U and L is relatively high in comparison with that between the pads 10 and 20 of the present invention. The shear type distortion shown by the lines D and D' is hard on the pads, causing early fatigue and perhaps failure of the elastomeric bodies, not experienced by pads according to the present invention in which most of the displacement takes place by sliding between the surface materials 14 and 24. According to tests run on the present preferred embodiment with neoprene bodies having a durometer hardness of 90, with a vertical loading of 500 p.s.i., the shear displacement was only 2.3 percent of the depth of the bottom pad.

FIG. 4 is similar to FIG. 2, but shows an elastomeric sheet or cap 30 of low durometer hardness draped over the sliding pads and abutting the top of the pier P to exclude foreign matter from the sliding joint.

FIG. 6 shows a modified upper pad 40 including an elastomeric body 42 united in suitable fashion with a special low-friction sliding surface material 44, and the whole pad having, in relaxed condition, a downwardly convex bow in the direction of the expansion and contraction of the structure above, so that when the pad is pressed tightly against the lower side of the beam B'' by the other pad in the pair therebelow (not shown), the top face 48 of the body of the pad 40 will tightly contact the lower face of the beam B'' and will not tend to sag away from it at one edge when supported by the other pad near the opposite edge.

FIG. 7 shows still another modification wherein the body 52 of the pad 50, and the antifriction sliding surface material 54 are roughened or provided with some sort of mutually interengaging projections 55 to insure a very permanent engagement therebetween.

In the preferred embodiment of FIG. 5, the upper sliding material 14 preferably comprises a semi-flexible epoxy resin of a type which will stretch to about 1.37 its normal length without tearing when tested in a one-eighth-inch thick sheet. The best known epoxy resin tested is the product of the reaction of epichlorhydrin and bisphenol A, and contains no unreactives or diluents, and is formulated using inert materials and fillers including, for example, finely divided silica, titanium oxide, calcium carbonate, silicate clays, calcium silicates, and carbonates, or organic fillers of the alpha cellulose variety and fibrous fillers of the asbestos family. In order to obtain a high degree of lubricity, lubricants such as graphite, tetrafluoroethylene, or silicones should be added. This epoxy composition is hardened by using a hardener of the polyimidazoline type covered by U.S. Patent No. 2,994,685. Another satisfactory hardener would be diethylenetriamine. The lower sliding material 24 is Teflon, and the coefficient of sliding friction between the epoxy resin 14 and the Teflon 24 is less than 0.10, and in fact equal to about 0.04. This Teflon resin layer is also one-eighth inch thick and can be stretched to 1.17 its normal length without failure. Since the epoxy sheet is uppermost and is larger than the Teflon sheet, it must be capable of some bending as the relative position of the Teflon moves about. Therefore, it should not be rigid, which leads to brittleness and cracking according to tests run thereon, nor should it be so soft as to be easily scratched.

The particular compounds suggested above are given by way of illustration rather than as limitations, for there are, no doubt, other materials which can serve the purpose.

I do not limit my invention to the illustrative embodiments, for obviously changes can be made therein within the scope of the following claims.

I claim:

1. Low-friction sliding load-bearing means for insertion between two relatively shiftable structural members, comprising two pads having sliding surfaces in mutual contact and both having a resilient elastomeric body each with one of its faces engaging one of said structural members, the opposite face of one body having an epoxy resin sheet laminated thereto and the sheet having a slick surface comprising one of said sliding surfaces, and the opposite face of the other body having a tetrafluoroethylene resin sheet laminated thereto and this sheet having a slick surface comprising the other of said sliding surfaces.

2. In load-bearing means as set forth in claim 1, said elastomeric bodies having durometer hardnesses substantially in the range of 50 to 90.

3. In load-bearing means as set forth in claim 1, said elastomeric bodies having durometer hardnesses substantially in the range of 50 to 90, and the coefficient of friction between the two sliding surfaces being no greater than 0.10.

4. In load-bearing means as set forth in claim 1, said pads being substantially horizontal and at least the top pad having a normal downwardly convex bow in its upper and lower surfaces for pressing its upper peripheral edges against the structural member in tight engagement when the lower surface of the pad is supported within its periphery.

5. Low friction sliding bearing means for insertion between a load structure and a stationary support comprising two pads having sliding surfaces in mutual contact and each having a resilient elastomeric body of durometer hardness of the range of 50 to 90, one surface of one body engaging the load structure and one surface of the other body engaging the support, the other surface of said one body having an epoxy resin sheet attached thereto and this resin being the product of a reaction of epichlorhydrin with bisphenol A and includes inert fillers and a lubricant, and the other surface of the other body having a sheet of tetrafluoroethylene attached thereto, each sheet being no greater than one-third the thickness of the body to which it is attached.

6. The bearing means set forth in claim 5 wherein the pads are disposed substantially horizontal and the epoxy sheet overlies the tetrafluoroethylene sheet and completely covers it in all relative positions of the pads.

References Cited by the Examiner

UNITED STATES PATENTS

| | | |
|---|---|---|
| 2,705,691 | 4/1955 | Panagrossi. |
| 2,719,761 | 10/1955 | Bonnafe _____ 308—34 |
| 2,809,130 | 10/1957 | Rappaport. |
| 2,815,252 | 12/1957 | Baker _____ 308—238 X |
| 2,906,552 | 9/1959 | White _____ 277—228 |
| 2,956,848 | 10/1960 | St. Clair _____ 308—238 X |
| 2,970,868 | 2/1961 | Geyer _____ 308—3 |
| 3,000,276 | 9/1961 | Foulger _____ 94—10 |
| 3,031,202 | 4/1962 | Melton _____ 308—238 X |
| 3,105,252 | 10/1963 | Milk _____ 14—16 |
| 3,113,493 | 12/1963 | Rinker _____ 14—16 |
| 3,171,698 | 3/1965 | Campbell _____ 308—3.8 |

FOREIGN PATENTS

| | | |
|---|---|---|
| 1,240,143 | 7/1960 | France. |
| 941,798 | 4/1956 | Germany. |
| 684,521 | 12/1952 | Great Britain. |
| 883,436 | 11/1961 | Great Britain. |

DAVID J. WILLIAMOWSKY, *Primary Examiner.*

FRANK SUSKO, DON A. WAITE, *Examiners.*

L. L. JOHNSON, *Assistant Examiner.*